(12) United States Patent
Wang et al.

(10) Patent No.: US 8,818,658 B2
(45) Date of Patent: Aug. 26, 2014

(54) ACTIVE DAMPING DURING CLUTCH ENGAGEMENT FOR ENGINE START

(71) Applicant: Ford Global Technologies, LLC, Dearborn, MI (US)

(72) Inventors: Qing Wang, Canton, MI (US); Wei Liang, Farmington Hills, MI (US); Mark Steven Yamazaki, Canton, MI (US); Walter Joseph Ortmann, Saline, MI (US); Ming Lang Kuang, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 14/019,987

(22) Filed: Sep. 6, 2013

(65) Prior Publication Data

US 2014/0004997 A1 Jan. 2, 2014

Related U.S. Application Data

(62) Division of application No. 13/446,256, filed on Apr. 13, 2012, now Pat. No. 8,538,643.

(51) Int. Cl.
| | |
|---|---|
| *B60W 20/00* | (2006.01) |
| *B60W 10/02* | (2006.01) |
| *B60W 10/06* | (2006.01) |
| *B60W 30/20* | (2006.01) |
| *B60W 10/08* | (2006.01) |

(52) U.S. Cl.
CPC ............... *B60W 20/10* (2013.01); *B60W 10/02* (2013.01); *Y02T 10/6286* (2013.01); *B60W 2710/083* (2013.01); *B60W 10/06* (2013.01); *F60W 2030/203* (2013.01); *B60W 2510/0208* (2013.01); *B60W 30/20* (2013.01); *Y10S 903/93* (2013.01); *B60W 20/00* (2013.01); *B60W 10/08* (2013.01)
USPC ................ 701/53; 701/67; 340/453; 903/930

(58) Field of Classification Search
CPC ..... B60W 20/10; B60W 10/02; B60W 10/06; B60W 10/08; B60W 20/00; B60W 2030/203; B60W 2510/208; B60W 2710/083; B60W 30/20; Y10S 903/93
USPC ....................................... 701/53, 67; 340/453
See application file for complete search history.

(56) References Cited

U.S. PATENT DOCUMENTS

| | | | |
|---|---|---|---|
| 6,112,874 | A | 9/2000 | Kopp et al. |
| 7,292,917 | B2 | 11/2007 | Kuang et al. |
| 7,317,978 | B2 | 1/2008 | Ashizawa et al. |

(Continued)

FOREIGN PATENT DOCUMENTS

| | | |
|---|---|---|
| JP | 11336581 | 12/1999 |
| WO | 2007102776 A1 | 9/2007 |

*Primary Examiner* — Mary Cheung
*Assistant Examiner* — Brian P Sweeney
(74) *Attorney, Agent, or Firm* — David B. Kelley; Brooks Kushman P.C.

(57) ABSTRACT

An active damping system provides a torque adjustment command that is combined with the raw motor torque command of a vehicle to compensate for oscillations and vibrations in the driveline of a hybrid vehicle. Active damping may be provided by a derivative controller or by a lead-lag compensation between initiation of clutch engagement and full clutch engagement. Active damping is terminated upon full clutch engagement.

15 Claims, 3 Drawing Sheets

(56) References Cited

U.S. PATENT DOCUMENTS

| | | |
|---|---|---|
| 7,680,567 B2 | 3/2010 | Syed et al. |
| 2006/0025906 A1 | 2/2006 | Syed et al. |
| 2006/0030979 A1 | 2/2006 | Kuang et al. |
| 2010/0023194 A1 | 1/2010 | Okubo et al. |
| 2010/0087290 A1* | 4/2010 | Schoenek et al. .......... 477/5 |
| 2010/0087996 A1 | 4/2010 | Haggerty et al. |
| 2010/0138107 A1 | 6/2010 | Morris et al. |
| 2011/0259698 A1 | 10/2011 | Arnold et al. |
| 2012/0175212 A1 | 7/2012 | Hart et al. |

* cited by examiner

ACTIVE DAMPING DURING CLUTCH ENGAGEMENT FOR ENGINE START

CROSS-REFERENCE TO RELATED APPLICATION

This application is a division of U.S. application Ser. No. 13/446,256 filed Apr. 13, 2012, the disclosure of which is hereby incorporated in its entirety by reference herein.

TECHNICAL FIELD

This disclosure relates to suppressing driveline oscillations in a modular hybrid vehicle by adjusting the torque command to the electric machine of the hybrid vehicle.

BACKGROUND

Hybrid vehicle architecture may take several forms for operatively connecting a battery, an electric traction motor and a combustion engine together in the driveline of the vehicle. One proposed architecture in development by the assignee of this application is a Modular Hybrid Transmission (MHT). One embodiment of the MHT is the Electric Converter-Less Transmission (ECLT). To replicate the torque converter function of a conventional automatic transmission, the MHT powertrain without a torque converter may rely upon active controls of a starter/alternator and a disconnect clutch between the combustion engine and the electric motor. Alternatively, the MHT may also be provided with a torque converter. A launch clutch or torque converter may be provided between the electric motor and the wheels.

The drivability of the MHT must be comparable to drivelines having a production automatic transmission. A major control challenge of the MHT is to absorb "clunks," pulsations and vibrations in the driveline during engine start and clutch engagement, creating a quieter, less stressful driving experience.

New challenges arise with MHT systems as to the coordination of the clutch, engine and motor, especially during the complicated clutch engagement transients. All the friction element control, pressure control, and the motor toque control should be integrated seamlessly to deliver smooth wheel torque. In addition, converter-less disconnect clutch engagement is very sensitive to the clutch pressure and it is a challenge to achieve the proper damping and smoothness during the clutch engagement.

The engine in a MHT must start smoothly and quickly. Every start is accompanied by a transient clutch engagement phase during which time substantial inertial drag and torque disturbances are transferred to the driveline. The difficulty and uncertainty of estimating the engine and clutch torque caused by complicated transient dynamics are a challenging task for motor torque compensation.

During the MHT clutch engagement transient for engine starts, there are problems of oscillations arising from the excitation of the mechanical resonance by various disturbances. This resultant oscillation phenomenon is due to low damping in the driveline due to the absence of a torque converter. Applying the electric motor torque generates torque ripples with frequencies that are motor speed dependent.

The above problems and other problems are addressed by the present disclosure as summarized below.

SUMMARY

An active damping strategy is proposed that allows for the improvement of the dynamic response and rejection of the driveline oscillations by adjusting the electric motor torque command during disconnect clutch engagement. Active damping is terminated when the disconnect clutch is fully engaged when active damping is terminated. Motor torque adjustment for active damping is based on the processing speed measurements obtained from the motor speed or wheel speed sensor. The active damping system adjusts the electric motor torque command to damp oscillations in the driveline.

According to one aspect of the disclosure, a hybrid vehicle is provided that comprises an electric machine, an engine and a battery for supplying power to the electric machine and a controller. The controller is configured to provide a base motor torque command, detect a period of clutch engagement after an engine start command is provided by the controller, and suppress a driveline oscillation during the period of clutch engagement. Driveline oscillations are suppressed by an active damping algorithm that adjusts the magnitude of the torque commanded from the motor by modifying the base motor torque command.

According to another aspect of the disclosure a method is provided for operating a hybrid vehicle having an engine that is selectively connected to a driveline by a disconnect clutch and a secondary power source. The method comprises obtaining a base motor torque command, detecting a period of clutch engagement after an engine start command that ends upon full clutch engagement, and attenuating oscillations in the driveline by providing an active damping torque adjustment to the base motor torque command.

According to other aspects of both the vehicle and the method, the suppression of driveline oscillation may be performed based upon a derivative controller that receives an input signal representative of a speed of rotation of a driveline component. The speed of rotation of the driveline component may be a motor speed signal or a wheel speed signal.

The derivative controller has the following transfer function in the s-domaine: $G=ks$ where s is the Laplace transform variable $k$=gain.

Alternatively, the suppression of the driveline oscillation may be performed based upon a lead-lag compensator controller. The lead-lag compensator has the following transfer function in the s-domain: $G=k(s+z)/(s+p)$, where: s is the Laplace transform variable; k=gain; z=zero; and p=pole.

According to other aspects of the disclosure, the disconnect clutch in the driveline between the electric machine and the engine may be selectively provided with hydraulic pressure to disengage the disconnect clutch. The hydraulic pressure may be reduced to zero when the engine is off, and the period of clutch engagement may be preceded by a time boosting period in which the clutch is filled and the hydraulic pressure is set to a stroke pressure. Alternatively, hydraulic pressure may be maintained at a stroke pressure when the engine is off. The disconnect clutch may be selectively provided with hydraulic pressure. If so, the period of clutch engagement may begin at the time of the engine start command.

These and other aspects of this disclosure will be more fully explained with reference to the attached drawings and the following detailed description of the illustrated embodiments.

DETAILED DESCRIPTION

A detailed description of the illustrated embodiments of the present invention is provided below. The disclosed embodiments are examples of the invention that may be embodied in various and alternative forms. The figures are not necessarily to scale. Some features may be exaggerated or minimized to show details of particular components. The specific structural and functional details disclosed in this application are not to be interpreted as limiting, but merely as a representative basis for teaching one skilled in the art how to practice the invention.

Figure 1A:
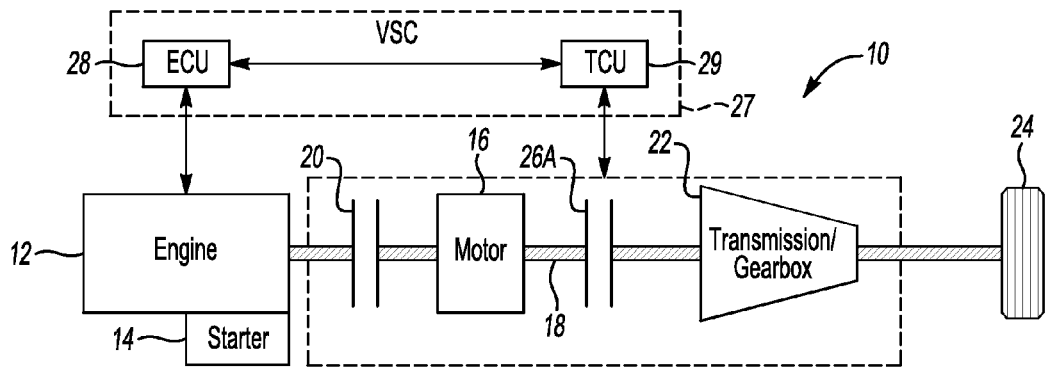
FIG. 1A is a diagrammatic view of a modular hybrid transmission system for a hybrid vehicle that does not include a torque converter.
Figure 1B:
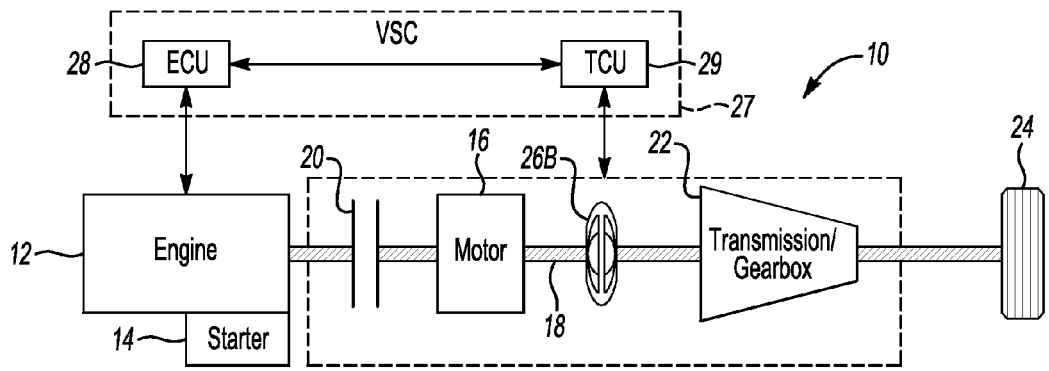
FIG. 1B is a diagrammatic view of an alternative embodiment of a modular hybrid transmission system for a hybrid vehicle that includes a torque converter.

Referring to FIGS. 1A and 1B, a modular hybrid transmission 10 is shown in a diagrammatic form. A engine 12 is operatively connected to a starter 14 that is used to start the engine 12 when additional torque is needed. A motor 16, or electric machine, is operatively connected to a driveline 18. A disconnect clutch 20 is provided on the driveline 18 between the engine 12 and the electric machine 16. A transmission 22, or gear box, is also provided on the driveline 18. Torque transmitted from the engine 12 and motor 16 is provided the driveline 18 to the transmission 22 that provides torque to the wheels 24. As shown in FIG. 1A, launch clutch 26A is provided between the transmission 22 and the engine 12 and/or motor 16 to provide torque through the transmission 22 to the wheels 24. As shown in FIG. 1B, a torque converter 26B is provided between the transmission 22 and the engine 12 and/or motor 16 to provide torque through the transmission 22 to the wheels 24. While elimination of the torque converter is an advantage of the embodiment of FIG. 1A, the present disclosure is also advantageous in reducing vibrations in systems having a torque converter 26B like that shown in the embodiment of FIG. 1B.

The vehicle includes a vehicle system control (VSC) for controlling various vehicle systems and subsystems and is generally represented by block 27 in FIG. 1. The VSC 27 includes a plurality of interrelated algorithms which are distributed amongst a plurality of controllers within the vehicle. For example, the algorithms for controlling the MHT powertrain are distributed between an engine control unit (ECU) 28 and a transmission control unit (TCU) 29. The ECU 28 is electrically connected to the engine 12 for controlling the operation of the engine 12. The TCU 29 is electrically connected to and controls the motor 16 and the transmission 22. The ECU 28 and TCU 29 communicate with each other and other controllers (not shown) over a hardline vehicle connection using a common bus protocol (e.g., CAN), according to one or more embodiments. Although the illustrated embodiment depicts the VSC 27 functionality for controlling the MHT powertrain as being contained within two controllers (ECU 28 and TCU 29) other embodiments of the HEV include a single VSC controller or more than two controllers for controlling the MHT powertrain.

Figure 2:
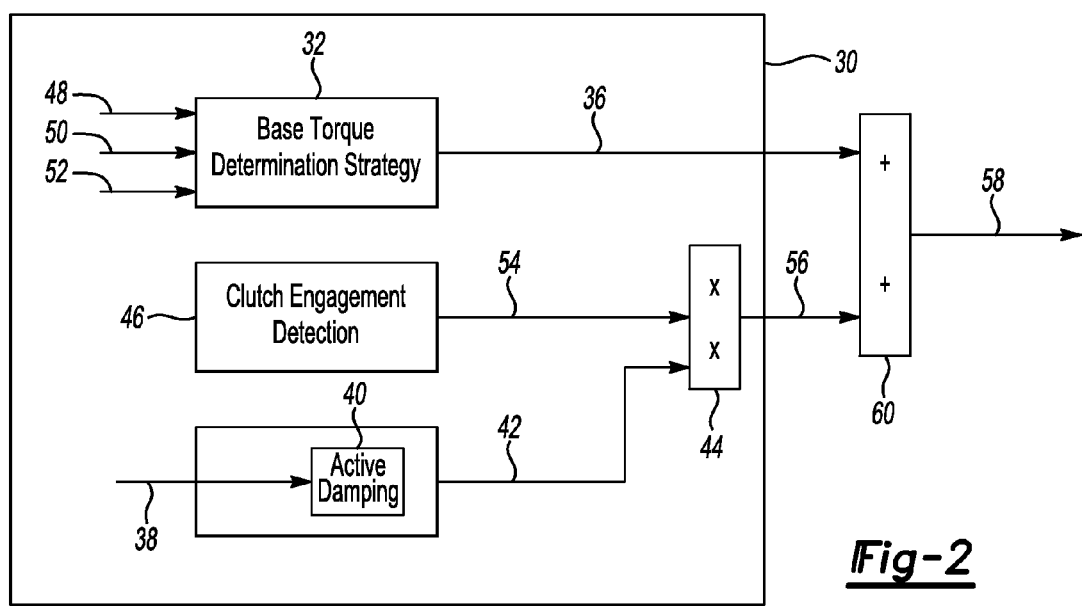
FIG. 2 is a control diagram for an active damping system for attenuating driveline oscillations.

Referring to FIG. 2, one embodiment of an active damping system 30 is shown. The VSC 27 includes a torque control algorithm 30, or strategy, which controls the disconnect clutch 20 and launch clutch 26. The control algorithm 30 and clutches 20 and 26A (or torque converter 26B) permit the modular hybrid transmission 10 to obtain additional operating efficiency. The control algorithm may be contained within the TCU 29 according to one or more embodiments, or may be incorporated in hardware or software control logic as described in detail below. A base motor torque determination strategy 32 is developed in a torque control system which controls operation of the engine 12 and motor 16 (shown in FIG. 1) and provides a raw motor torque command output signal 36.

An absolute value speed signal 38 is provided to an active damping control routine 40. The absolute value speed signal 38 may be the motor speed signal or a vehicle speed signal. The active damping control routine 40 is based upon processing a motor speed value or a wheel speed value that is obtained from a sensor. The active damping control routine 40 produces a compensating torque to damp oscillatory modes of the driveline 18 (shown in FIG. 1). A closed loop feedback control system is applied to adjust the torque control to suppress driveline oscillations. In the closed loop system, a compensator is placed in the feedback path that uses the motor speed or wheel speed as an input. The compensator output, or delta motor torque signal 42, is provided to a block 44.

Part of the active damping system 30 includes a clutch engagement detection routine 46. The clutch engagement detection routine 46 may include inputs, such as a clutch pressure input 48, a rotational speed of the engine input 50 and a rotational speed of the motor input 52. The clutch engagement detection routine processes the inputs and sets a flag 54, as will be more specifically described with reference to FIG. 3 below. The delta motor torque signal 42 is transmitted in the form of an active damping motor torque signal 56 when the set flag condition is satisfied in block 44. The raw motor torque command 36 is adjusted by the active damping motor torque signal 56 to provide the motor torque command signal 58 to the motor 16 (shown in FIG. 1).

Figure 3:
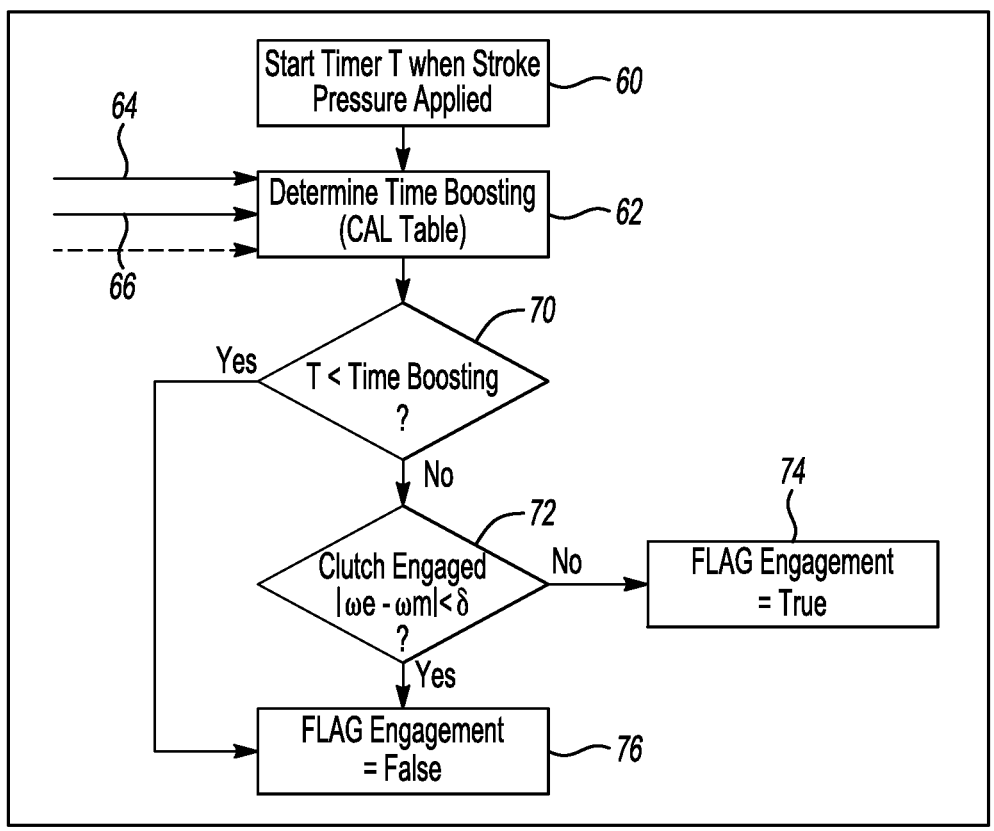
FIG. 3 is a control diagram for a transient clutch engagement detection system.

Referring to FIG. 3, the clutch engagement detection routine 46 is shown in greater detail. The clutch engagement detection algorithm begins by starting a timer in block 60. The system determines the time boosting value 62 based upon inputs including a hydraulic oil temperature input 64 and a hydraulic line pressure input 66. Other signals may also be used to more closely approximate the time required to boost the clutch fluid pressure prior to beginning clutch engagement. The temperature 64 and line pressure 66 are used to determine the time boosting factor in systems where, if fully disengaged, the clutch pressure is permitted to fall below a stroke pressure value to zero and thereby further improve system efficiency.

In systems where the stroke pressure is always maintained by the hydraulic pump that services the disconnect clutch 20 (as shown in FIGS. 1A and 1B), the step of determining the time boosting factor may be omitted. However, in a system where time boosting is required to compensate for delays actuated in the clutch, the time T corresponding to the start of the timer when the stroke pressure is applied at block 60 is compared to the time boosting value at block 70. If the time T is less than the time boosting factor, the flag for clutch engagement is set to equal false at block 76. Alternatively, if the time T is not less than the time boosting factor at block 70, the algorithm proceeds to block 72 to determine whether the clutch 20 is engaged by taking the absolute value of the speed of rotation of the engine less than the speed of rotation of the motor. If the absolute value is less than a specified tolerance value, the flag is set to clutch engagement true at block 74. When the flag is set at block 74, the delta motor torque signal 42 is used to adjust the active damping motor torque signal 56. The delta motor torque signal 42 is combined with the raw motor torque command 36 to provide the desired motor torque command 58 that includes adjustments for active damping.

The engagement detection algorithm first detects the beginning of the contact point at which the clutch force begins to drag the engine up to overcome engine inertia. The clutch travel distance and boosting time ($Time_{boosting}$) before the clutch transmits torque are approximately predictable and may be derived based upon a stored value table. The duration of $Time_{boosting}$ can be inferred from the line pressure command alone assuming that the impact of the temperature of the hydraulic oil is negligible. The relationship of $Time_{boosting}$ and line pressure can be captured in a calibration table that may be construed empirically based upon clutch engagement experimentation testing. The timing of the contact point may be inferred from the known $Time_{boosting}$ and known timing of the clutch pressure command. The ending point of the engagement where the clutch is fully engaged can be detected by measuring the difference between the engine and motor speeds. Clutch engagement is completed when the engine speed signal and motor speed signal are equal or within a predetermined difference.

In systems where a minimum stroke pressure is provided by the hydraulic system of the clutch, clutch engagement detection may begin with application of the stroke pressure without requiring the calculation of a $Time_{boosting}$ timing factor. In such systems, the clutch engagement flag is immediately set upon application of the stroke pressure to the clutch and terminates when the engine and motor speeds are close enough or equal as indicated previously.

Referring back to FIG. 2, the active damping closed loop control at 40 may be provided by using a derivative controller on the feedback path. The derivative controller has the following transfer function in s-domain:

$G=ks$ where:

k=gain;

s is the Laplace transform variable.

The derivative control system places a compensator with the motor speed (or wheel speed) as its input in the feedback path into the motor torque command to attenuate oscillations.

Alternatively, the active damping closed loop control 40 may be provided by the a lead-lag compensator with the following transfer function in s-domain:

$G=k(s+z)/(s+p)$ where:

k=gain;

z=zero;

p=pole; and s is the Laplace transform variable.

The above equation is a simple first order filter that is used to approximate a derivative control. The z and p values are selected according to the frequency that the closed loop system desires. With either the derivative control or lead-lag compensation, no additional sensor is required since the motor speed or wheel speed sensor is already provided for motor control or anti-lock braking system (ABS) control. Attenuation of disturbances at resonant frequencies can be obtained if the compensator and the gains are properly designed. A desired frequency response from the torque command to the shaft torque can be provided to the motor 16.

Figure 4:
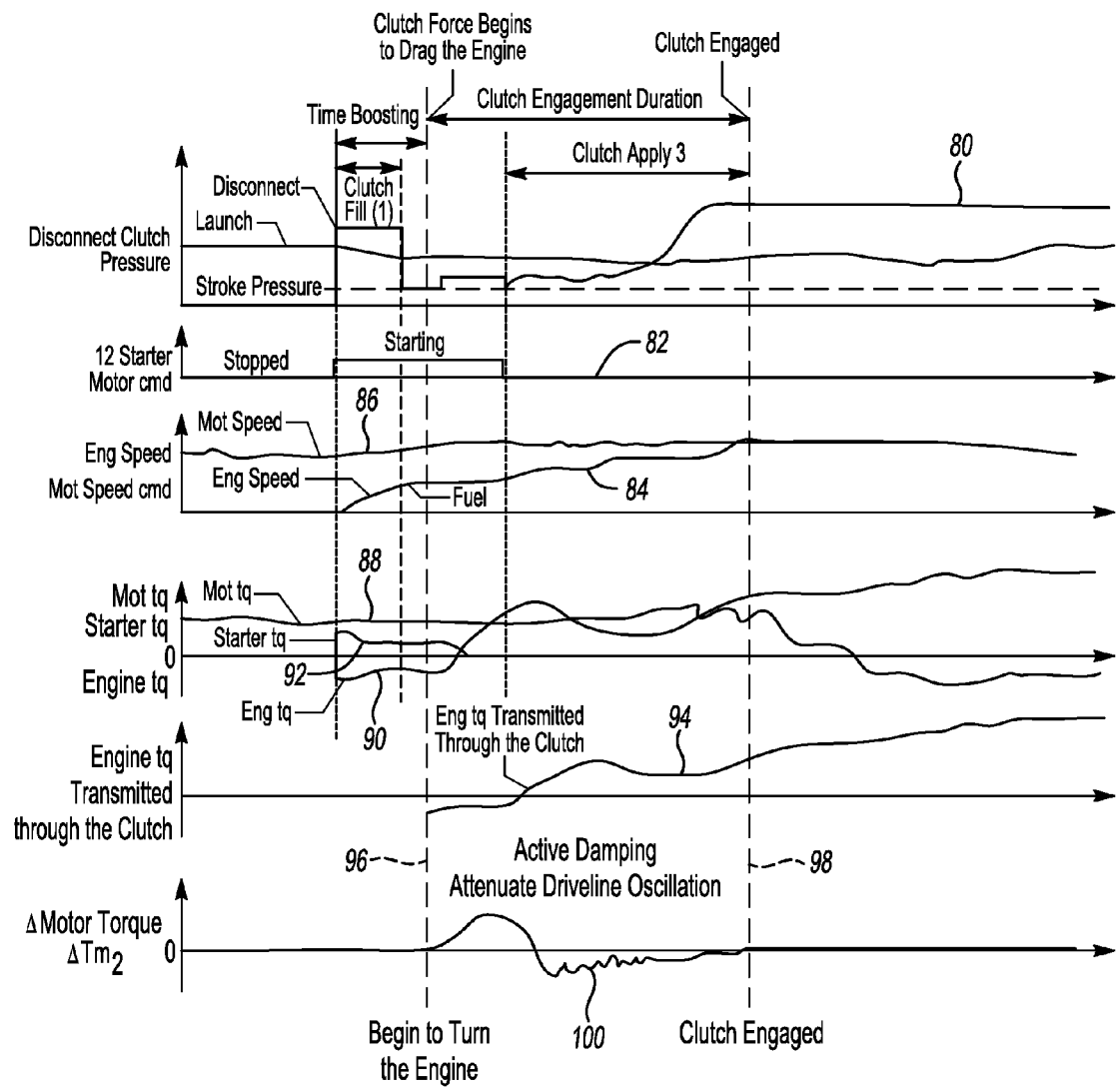
FIG. 4 is a graphical representation of an active damping system during transient clutch engagement.

Referring to FIG. 4, an illustration of the active damping adjustment of the motor torque is illustrated. Referring to FIG. 4, top line 80 illustrates the disconnect clutch pressure from a point at which the engine is not operational and the vehicle is being powered by the electric motor. The disconnect clutch pressure in systems where the stoke pressure is permitted to drop to zero is presumed to be at zero. A starter signal 82 indicates that in the initial period the starter is stopped, but upon initiation of engine operation, the starter motor is initiated as indicated by the elevated portion of line 82. Upon initial start-up, the clutch 20 fills with maximum pressure being provided to fill the clutch. Upon filling, the pressure within the clutch is permitted to fall to a stoke pressure level just prior to the time that the clutch force begins to drag the engine. The engine speed, shown by line 84, is initially zero, but begins to increase shortly after the initial starting command. At this point, the starter has started the engine and fuel is provided to the engine, whereupon the engine speed increases as the result of the beginning of the combustion process. The engine speed continues to increase until it reaches the motor speed indicated by line 86. Upon the engine speed 84 reaching the motor speed 86, a determination is made that the clutch is fully engaged.

Referring to line 88, representing the motor torque, motor torque remains relatively constant throughout the pre-starting and clutch engagement process. The engine torque, shown by line 90 is initially negative when the starter/motor begins providing starter torque as shown by line 92. Engine torque increases rapidly after the engine starts at which point torque is being provided by both the motor, as shown by line 88, and by the engine, as shown by line 90. Transmission of engine torque through the clutch is shown by line 94 which indicates that initially engine torque transmitted to the clutch is negative, but as the engine torque increases, the engine torque transmitted to the clutch likewise increases as shown by line 94. The continuing clutch engagement is shown by dotted line 96 in FIG. 4 and the clutch fully engaged condition is indicated by the dotted line 98 in FIG. 4.

The delta motor torque line 100 illustrates the operation of the active damping system to attenuate driveline oscillation. The delta motor torque signal is made available beginning when the clutch force begins to drag the engine at the dotted line 96. Active damping whether under the derivative control or lead-lag compensation approach provides a basis for adjusting the motor torque command 58, as shown in FIG. 2. Active damping continues until the clutch is fully engaged at dotted line 98. After the clutch is fully engaged, active damping is no longer required to attenuate oscillations caused by the engine start-up and clutch engagement.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A hybrid vehicle comprising:
    a motor;
    an engine and a battery for supplying power to the motor;
    a hydraulically actuated disconnect clutch selectively connects the motor and the engine; and
    at least one controller configured to modify motor torque based upon driveline speed during a period of clutch engagement after an engine start to suppress a driveline oscillation during the period of clutch engagement, wherein the motor torque is modified based upon a derivative controller that receives an input signal representative of a speed of rotation of a driveline component.

2. The hybrid vehicle of claim 1 wherein the speed of rotation of the driveline component is a motor speed signal.

3. The hybrid vehicle of claim 1 wherein speed of rotation of the driveline component is a wheel speed signal.

4. The hybrid vehicle of claim 1 wherein the motor torque is calculated by the derivative controller in response to a motor speed input signal.

5. The hybrid vehicle of claim 1 wherein the motor torque is calculated by the derivative controller in response to a wheel speed input signal.

6. The hybrid vehicle of claim 1 wherein the motor torque is controlled based upon a lead-lag compensator controller.

7. The hybrid vehicle of claim 1 wherein the hydraulic pressure is reduced to zero when the engine is off, and wherein the period of clutch engagement is preceded by a time boosting period in which the clutch is filled and the hydraulic pressure is set to a stroke pressure.

8. The hybrid vehicle of claim 1 wherein the disconnect clutch is selectively provided with hydraulic pressure to actuate the disconnect clutch, wherein the hydraulic pressure is maintained at a stroke pressure when the engine is off, and wherein the period of clutch engagement begins with the engine start.

9. A method of operating a hybrid vehicle having an engine that is selectively connected to a driveline by a disconnect clutch that is selectively actuated by hydraulic pressure and a motor comprising:

during a period of clutch engagement after an engine start that ends upon full clutch engagement attenuating oscillations in the driveline by modifying motor torque, and wherein attenuating oscillations in the driveline is performed based upon a derivative controller that receives an input indicative of a driveline component speed.

10. The method of claim 9 wherein the driveline component speed is a motor speed signal.

11. The method of claim 10 wherein motor torque is controlled by a derivative controller that receives the motor speed signal.

12. The method of claim 9 wherein the driveline component speed is a wheel speed signal.

13. The method of claim 12 wherein the motor torque is controlled by a derivative controller that receives the wheel speed signal.

14. The method of claim 9 wherein attenuating oscillations in the driveline is performed based upon a lead-lag compensator controller.

15. The method of claim 9 wherein the disconnect clutch is selectively provided with hydraulic pressure to connect or disconnect the disconnect clutch, wherein the hydraulic pressure is reduced to zero when the engine is off, and wherein the period of clutch engagement is preceded by a time boosting period in which the clutch is filled and the hydraulic pressure is set to a stroke pressure.

* * * * *